United States Patent
Hillesland et al.

(10) Patent No.: US 9,626,789 B2
(45) Date of Patent: Apr. 18, 2017

(54) IMPLICIT TEXTURE MAP PARAMETERIZATION FOR GPU RENDERING

(71) Applicant: Advanced Micro Devices Inc., Sunnyvale, CA (US)

(72) Inventors: Karl E. Hillesland, San Carlos, CA (US); Justin Hensley, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 538 days.

(21) Appl. No.: 13/889,169

(22) Filed: May 7, 2013

(65) Prior Publication Data

US 2014/0333621 A1  Nov. 13, 2014

(51) Int. Cl.
  *G06T 15/04*  (2011.01)

(52) U.S. Cl.
  CPC .......... *G06T 15/04* (2013.01); *G06T 2210/36* (2013.01)

(58) Field of Classification Search
  CPC .............................. G06T 15/04; G06T 3/4007
  See application file for complete search history.

(56) References Cited

U.S. PATENT DOCUMENTS

| | | | | |
|---|---|---|---|---|
| 4,811,245 A * | 3/1989 | Bunker | .................. | G09B 9/301 345/440 |
| 5,606,650 A * | 2/1997 | Kelley | .................... | G06T 15/04 345/428 |
| 5,986,664 A * | 11/1999 | Dijkstra | .................. | G06T 15/10 345/419 |
| 6,057,861 A * | 5/2000 | Lee | .......................... | G06T 1/60 345/552 |
| 6,184,894 B1 * | 2/2001 | Rosman | ................ | G06T 3/4007 345/428 |
| 6,204,857 B1 * | 3/2001 | Piazza | ..................... | G06T 15/04 345/582 |
| 6,222,555 B1 * | 4/2001 | Christofferson | ........ | G06T 15/04 345/428 |
| 6,297,834 B1 * | 10/2001 | Malzbender | ............ | G06T 15/04 345/586 |
| 6,396,503 B1 * | 5/2002 | Goss | ....................... | G06T 15/04 345/422 |
| 6,417,860 B1 * | 7/2002 | Migdal | .................. | G06T 15/04 345/426 |
| 6,677,946 B1 * | 1/2004 | Ohba | ...................... | G06T 15/60 345/426 |

(Continued)

*Primary Examiner* — Jacinta M Crawford
*Assistant Examiner* — Jitesh Patel
(74) *Attorney, Agent, or Firm* — Staniford Tomita LLP

(57) ABSTRACT

Embodiments are described for a method for processing textures for a mesh comprising quadrilateral polygons for real-time rendering of an object or model in a graphics processing unit (GPU), comprising associating an independent texture map with each face of the mesh to produce a plurality of face textures, packing the plurality of face textures into a single texture atlas, wherein the atlas is divided into a plurality of blocks based on a resolution of the face textures, adding a border to the texture map for each face comprising additional texels including at least border texels from an adjacent face texture map, and performing linear interpolation of a trilinear filtering operation on the face textures to resolve resolution discrepancies caused when crossing an edge of a polygon.

22 Claims, 7 Drawing Sheets

(56) References Cited

U.S. PATENT DOCUMENTS

| | | | | |
|---|---|---|---|---|
| 6,738,062 B1* | 5/2004 | Moreton | G06T 17/20 | 345/420 |
| 6,919,904 B1* | 7/2005 | Kilgariff | G06T 15/04 | 345/426 |
| 6,958,752 B2* | 10/2005 | Jennings, Jr. | G06T 19/20 | 345/419 |
| 7,109,999 B1* | 9/2006 | Lindholm | G06T 15/04 | 345/572 |
| 7,605,820 B1* | 10/2009 | Rogers | G06T 15/04 | 345/419 |
| 7,982,745 B1* | 7/2011 | Donovan | G06T 15/04 | 345/428 |
| 2003/0128217 A1* | 7/2003 | Brokenshire | G06T 1/60 | 345/581 |
| 2005/0057569 A1* | 3/2005 | Berger | G06T 13/40 | 345/473 |
| 2005/0122330 A1* | 6/2005 | Boyd | G06F 9/325 | 345/501 |
| 2005/0280654 A1* | 12/2005 | Boyd | G06T 15/00 | 345/559 |
| 2006/0092167 A1* | 5/2006 | Wetzel | G06T 9/00 | 345/582 |
| 2006/0267982 A1* | 11/2006 | Aguera y Arcas | G06F 3/0481 | 345/428 |
| 2008/0303841 A1* | 12/2008 | Newhall, Jr. | G06T 1/60 | 345/587 |
| 2009/0021522 A1* | 1/2009 | Burley | G06T 15/04 | 345/582 |
| 2010/0091028 A1* | 4/2010 | Grossman | G06T 15/04 | 345/587 |
| 2011/0001756 A1* | 1/2011 | Burley | G06T 15/04 | 345/587 |
| 2011/0080405 A1* | 4/2011 | Moreton | G06T 17/20 | 345/423 |
| 2011/0128285 A1* | 6/2011 | Gong | G06T 17/20 | 345/423 |
| 2011/0157206 A1* | 6/2011 | Duluk, Jr. | G06T 15/04 | 345/582 |
| 2012/0229464 A1* | 9/2012 | Fishwick | G06T 17/20 | 345/423 |
| 2013/0278601 A1* | 10/2013 | Chen | G06T 15/04 | 345/426 |

* cited by examiner

800

802

804

806

808

710

IMPLICIT TEXTURE MAP PARAMETERIZATION FOR GPU RENDERING

TECHNICAL FIELD

One or more implementations relate generally to processors including graphical processing units, and more specifically to an efficient texture mapping process for rendering.

BACKGROUND

In computer graphics, texture mapping is a method for adding detail, surface texture, or color to a graphic object or 3D model. Texture filtering or smoothing is a method of determining the texture color for a texture mapped object using the colors of nearby texels (texture pixels) to allow a texture to be applied to many different shapes, sizes and angles while alleviating aliasing due to sampling artifacts.

UV mapping is a common 3D modeling process of making a 2D image representation of a 3D model that projects a texture map onto a 3D object. The process involves assigning pixels in the image to surface mappings on the polygon, typically by copying triangular (or other polygon) faces of the image map onto corresponding polygons on the object. When a model is created as a polygon mesh, UV coordinates (where 'U' and 'V' denote the axes of the 2D texture) can be generated for each vertex in the mesh. This is done by unfolding the polygon mesh at the seams and laying them out flat. Once the model is unwrapped, an artist can paint a texture on each polygon individually, and when the scene is rendered each polygon will then map to the appropriate texture.

A fundamental texture authoring problem is that it is difficult to unwrap a mesh with arbitrary topology onto a continuous 2D rectangular texture domain. In general, meshes are broken into pieces that are unwrapped into charts and packed into a rectangular texture domain as an atlas. Artists typically spend a great deal of time setting up UV coordinates to minimize distortion and wasted space in the texture when they could instead be working on the actual painting and modeling. Another problem associated with UV modeling is that edges of each chart in the atlas introduce seam artifacts. This seam problem is especially pronounced when the texture is a displacement map used for hardware tessellation, as any discrepancy manifests as a crack in the surface.

Per-face texturing (Ptex) is a texture mapping system that was developed to address some of the issues with UV mapping. Ptex associates a small independent texture map with each face of the mesh and thus applies a separate texture to each face of a polygon mesh. The main advantages of Ptex over conventional texture atlasing is that there is no need for explicit UV definitions and there are no seaming issues arising from unwrapping a complete mesh of arbitrary topology onto a single-texture domain. Ptex, however, has certain drawbacks relative to conventional texture atlasing. Significantly, Ptex is limited with regard to real time performance, in that it is typically not practical to have an individual texture for each primitive, and the indirection required when a filter kernel crosses from one face to another is costly in performance, and precludes the use of any hardware texture filtering. The existing Ptex method does not address displacement mapping or texture compression, and other methods that involve displacement maps require manual fix-up or are restricted to simple models.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY OF EMBODIMENTS

Some embodiments are directed to a method and system for processing textures for a mesh comprising polygons for real-time rendering of an object or model in a processor, comprising associating an independent texture map with each face of the mesh to produce a plurality of face textures, packing the plurality of face textures into a single texture atlas, wherein the atlas is divided into a plurality of blocks based on a resolution of the face textures, adding a border to the texture map for each face comprising additional texels including at least border texels from an adjacent face texture map, and performing linear interpolation of a trilinear filtering operation on the face textures to resolve resolution discrepancies caused when crossing an edge of a polygon. These embodiments can also include a process that is configured to average texel values in the border to enable displacement mapping of the mesh.

Some embodiments are directed to an implicit texture parameterization method and system that builds on the Ptex texture mapping method that assigns a small texture to each face of a model. A packed texture atlas process packs all face textures and their mip levels into a single texture atlas. The textures and mip levels are sorted by resolution of the faces. Textures, including mips of the same resolution, are laid out one after the other so that location of a particular texture within the resolution block can be relatively easily computed using face texture resolution, texture width, and index within that resolution block. The index of the face within a block and the face's maximum resolution is computed from a prefix sum of resolution count and the sorting. The textures are padded with borders and corners from adjacent faces to enable hardware bilinear filtering and good block-based texture compression. Borders and corners are set to the same values as their neighbors by averaging or similar methods in the case of displacement maps to avoid cracks when using rendering techniques that independently determine edge positions at runtime.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Embodiments are generally directed to a real-time Ptex and vector displacement method that comprises a single packed texture atlas, and which may be referred to herein as a 'packed texture atlas' process. This method embodies an implicit parameterization of a quad-based model for texture mapping, including displacement mapping. A packed texture atlas method builds on the Ptex method by packing per polygon (face) (e.g., quads) textures into a single texture atlas and padding the per-polygon textures for bilinear filtering and texture compression. Displacement mapping without cracks is achieved by modification of the borders, and a prefix sum is used to enable runtime texture lookups Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Figure 1:
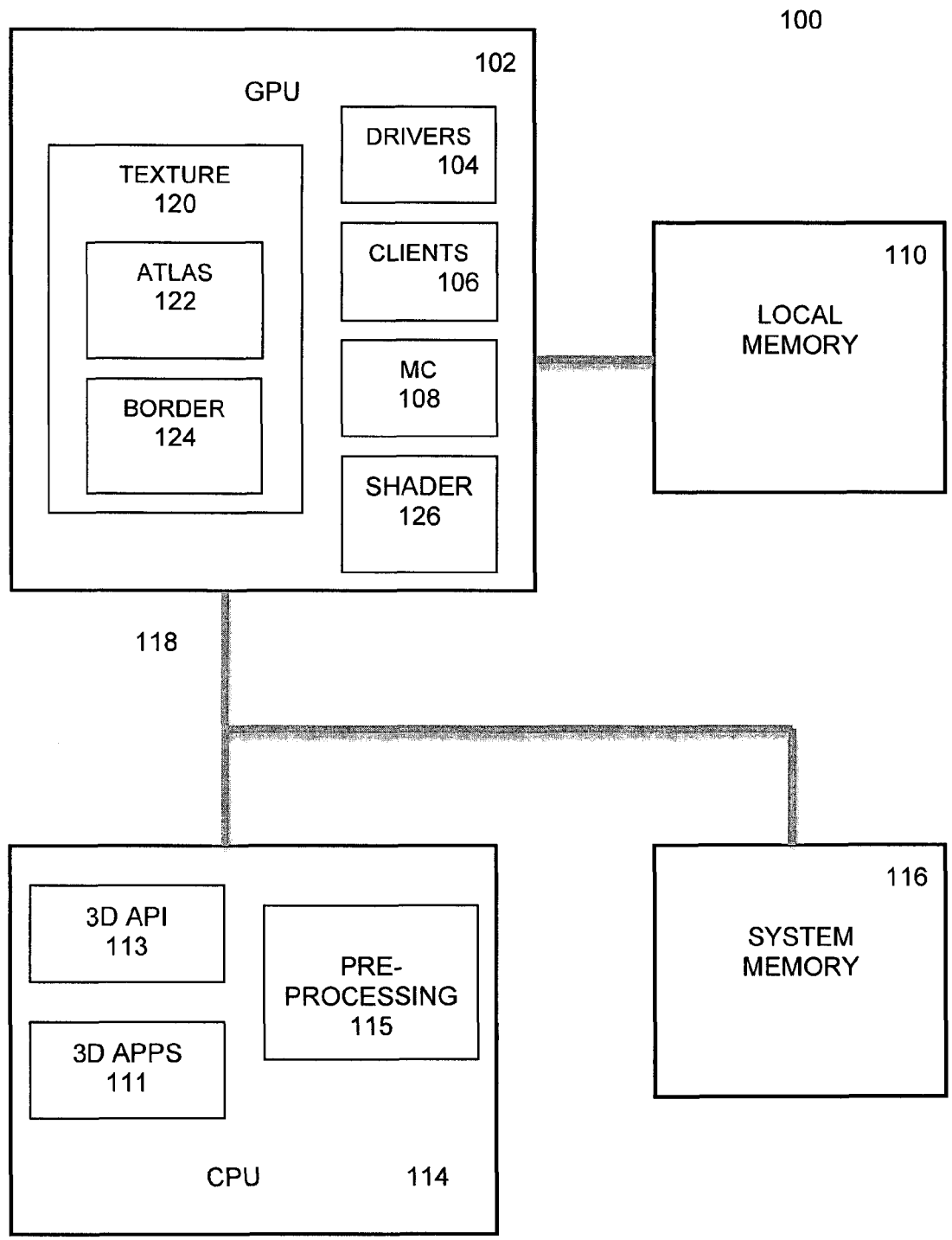
FIG. 1 is a block diagram of a graphics system that implements a texture component including a Ptex packer, under some embodiments.

FIG. 1 shows an example of a system embodying some embodiments of a packed texture atlas and vector displacement method, and is not intended to be limiting. System 100 includes a graphics processing unit (GPU) 102 coupled to a central processing unit (CPU) 114. The CPU executes one or more 3D applications 111 that utilize the processing components of GPU 102 through a 3D API (application program interface) 113. The CPU also includes certain functional components to perform pre-processing 115 for GPU 102. As will be appreciated by those of ordinary skill, CPU 114 and GPU 102 could be combined into a single processor. Additionally, the methods and apparatus described herein could be embodied in other types of processors (e.g., apps or application processors, digital signal processors, etc.)

The GPU 102 is a processing unit that performs high-speed memory operations to accelerate the creation of images in a frame buffer intended for output to a display. The frame buffer is a memory structure that includes individual memory locations for each pixel of the display. The GPU performs tasks related to generating 3D computer graphics such as texture mapping, rendering polygons, shading, and anti-aliasing, among other functions. The GPU 102 includes one or more drivers 104, a memory controller 108 and one or more clients 106. The clients 106 communicate with the memory controller 108 that controls access to a local memory 110 and a GPU-CPU bus 118. The GPU also includes one or more shader programs (shaders) 122. The GPU 102 is coupled to the CPU 114 over a bus 118, which also provides a connection to system memory 116.

As shown in FIG. 1, the GPU 102 includes a texture process 120 that may be embodied in a texture mapping component that adds detail, surface texture or color to a the computer-generated graphics produced by the 3D applications 111.

In certain embodiments, one or more of the functions within GPU 102, such as shader 126 or texture function 120 may be stored on the system memory 116, or a combination of memory devices in the system 100.

In some embodiments, the texture process 120 is an implicit texture parameterization method that incorporates aspects of the Ptex texture mapping system and that implements a packed texture atlas process. For purposes of this description, Ptex refers to the per-face texture mapping method developed by Disney Animation Studios for production rendering, as known by those of ordinary skill in the art. Texture process 120 includes an atlas processing component 122 that reduces the number of textures required in comparison to normal implementations of a Ptex process to reduce memory and processing overhead and to improve the realtime vector processing capabilities of Ptex. The GPU system 102 utilizing packed texture process 120 provides improved vector displacement mapping to enable runtime execution of a Ptex-based texture mapping process. In general, the packed texture process 120 targets meshes consisting of polygons (e.g., quads) and associates a small independent texture map with each face of a mesh, where each texture map has its own mip chain. In addition, additional border information is used for filtering across the edge of one face texture and into the next face texture for purposes of filtering and smoothing. Adjacency information can also be used to alleviate resolution discrepancy issues.

The texture process 120 includes an atlas processing component 122 that reduces the number of textures required by packing all face textures and their mip chains into a single texture atlas. In general, a texture atlas is a large image or data structure that stores a collection of sub-images, each of which is a texture for some part of a 3D object, and which is treated as a single unit by the GPU. The sub-textures can be rendered by modifying the texture coordinates (e.g., UV coordinates) on the atlas. Atlases can consist of uniformly-sized sub-textures, or they can consist of textures of varying sizes (usually restricted to powers of two).

In general, a mipmap is a precalculated copy of an image that has been shrunk to a lower resolution using a more accurate, higher quality filtering algorithm than would be possible in realtime on the GPU, and mipmaps are arranged in a chain where each image is half the size of the previous one. Thus, as the textured surface moves farther away, the texture being applied switches to the profiteered smaller size. Different sizes of the mipmap are referred to as 'levels', with Level 0 being the largest size (used closest to the viewer), and increasing levels used at increasing distances. Each bitmap image of the mipmap set is a version of the main texture, but at a certain reduced level of detail (LOD). The renderer switches to a suitable mipmap image or interpolates between the two nearest, if trilinear filtering is activated, when the texture is viewed from a distance or at a small size. Rendering speed increases since the number of texels being processed is much lower than with simple textures, and artifacts are reduced since the mipmap images are effectively already anti-aliased. The use of mipmaps also makes scaling images much more efficient as well.

Figure 2:
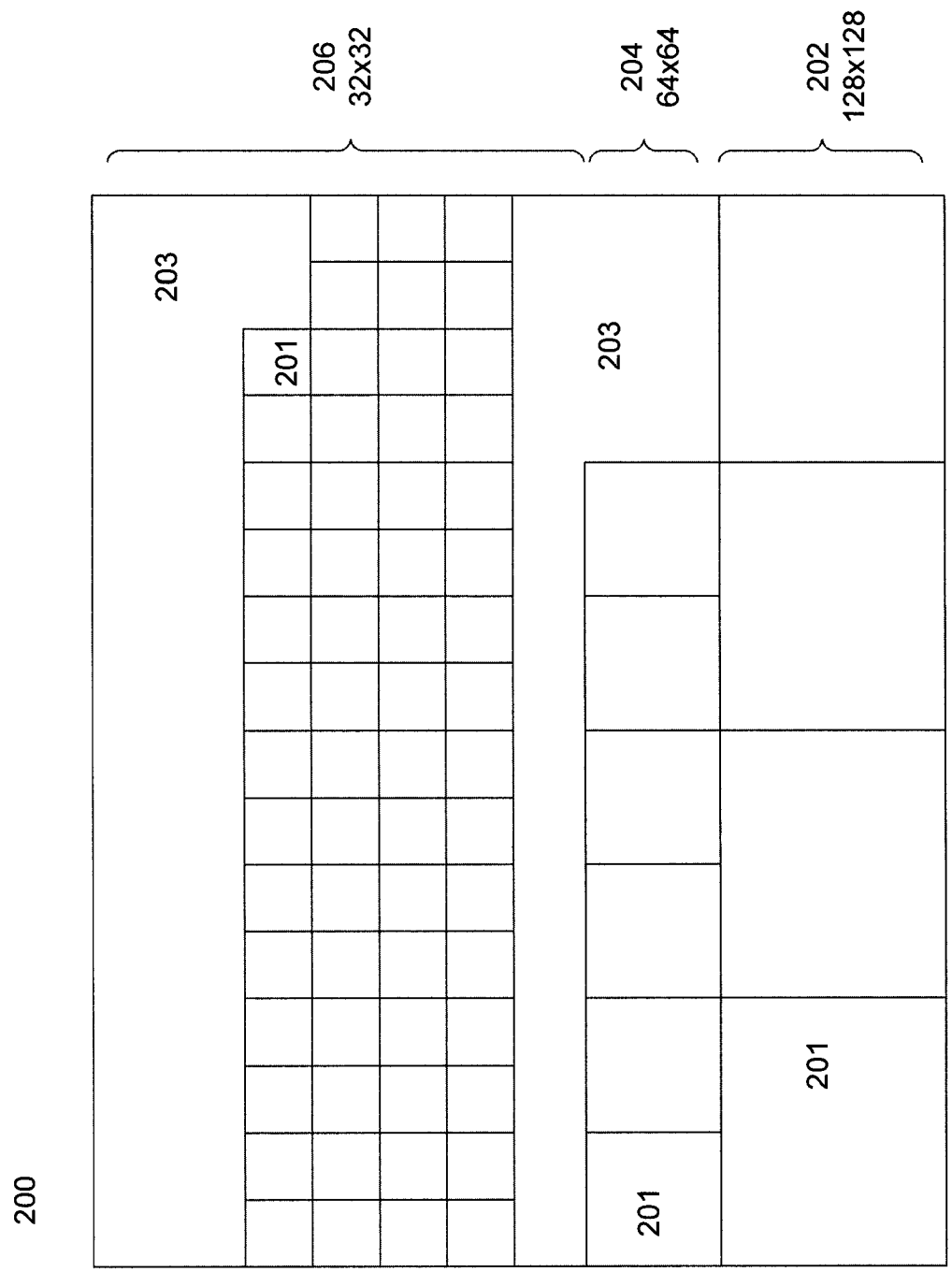
FIG. 2 illustrates the composition of a texture atlas produced by a texture process, under some embodiments.

The atlas processing component 122 generates a texture atlas that is divided into blocks of the same resolution. Within each block, the face textures are packed one after the other in rows. Because the atlas width is generally not a multiple of the face-texture width, there will be unused texels at the end of each row. There will usually also be additional empty space at the end of the last row, because it will often not be filled to capacity. FIG. 2 illustrates the composition of a texture atlas produced by a texture process, under some embodiments. Diagram 200 illustrates a portion of an example texture atlas that represents a packed Ptex atlas that is organized into three blocks 202, 204 and 206 in order of increasing resolution. For example, block 202 could be of resolution 128×128, block 204 could be of resolution 64×64, and block 206 could be of resolution 32×32, though other resolutions are also possible. The example of FIG. 2 illustrates a case where there are four faces that have a base level 0 resolution 202 (e.g., 128×128), one with a level 1 resolution 204 (e.g., 64×64), and a number with a level 2 resolution 206 (e.g., 32×32). The 204 block contains both the one level 0 for the 64×64 resolution face texture, and the four level 1 mips from the 128×128 face textures. In a typical implementation, each block has a number of faces 201 as well as some possible empty space or unused texels 203 that are created because of dimensional mismatch and rows not being filled to capacity.

It should be noted that FIG. 2 is intended to be an example of one possible configuration of a single texture atlas, and many other atlas configurations are possible. The atlas may be of any practical size (e.g., from two blocks to eight blocks), the blocks may be any practical resolution, such as from 2×2 all the way up to 1024×1024 or more, and any number of face textures may be stored within each block.

For the texture atlas 200, each face texture 201 has its own mip chain. The faces are sorted by their base (level 0) resolution to create the packing of the faces into blocks. Since the face textures may be included with different base resolutions, a given block will include different mip levels, as shown in FIG. 2.

Figure 3:
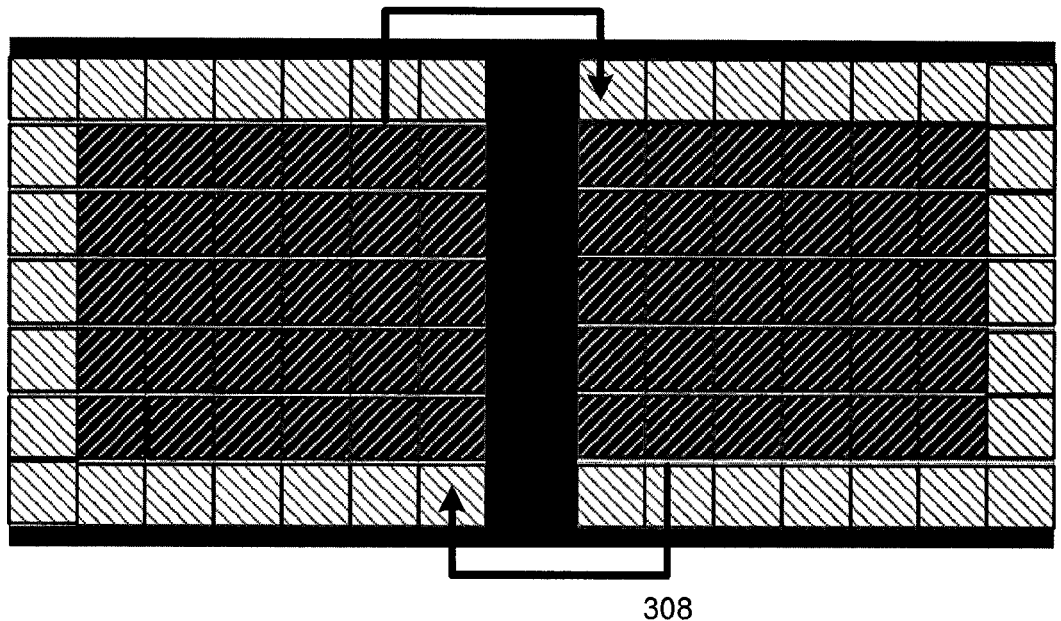
FIG. 3 illustrates a process of processing border texels, under some embodiments.

In some embodiments, the packed texture process 120 includes a border processing component 124 that provides borders for filtering, as shown in FIG. 1. In general, the texture filtering hardware assumes that neighbors in texture space are also neighbors in model space. However, this is usually not true either for conventional texture atlasing methods nor for Ptex, and is often the that reason conventional texture atlasing methods come with seam artifacts. The border processing component 124 copies texels from the border of a neighboring face to address this problem. FIG. 3 illustrates a process of processing border texels, under some embodiments. As shown in FIG. 3, border texels 304 for a first face 302 are copied next to border texels 308 for a second face 306. In this manner, there will be data available when the texture filter crosses the edge of the face texture. The padding 310 on each side is equal to at least half the filter width.

Figure 4:
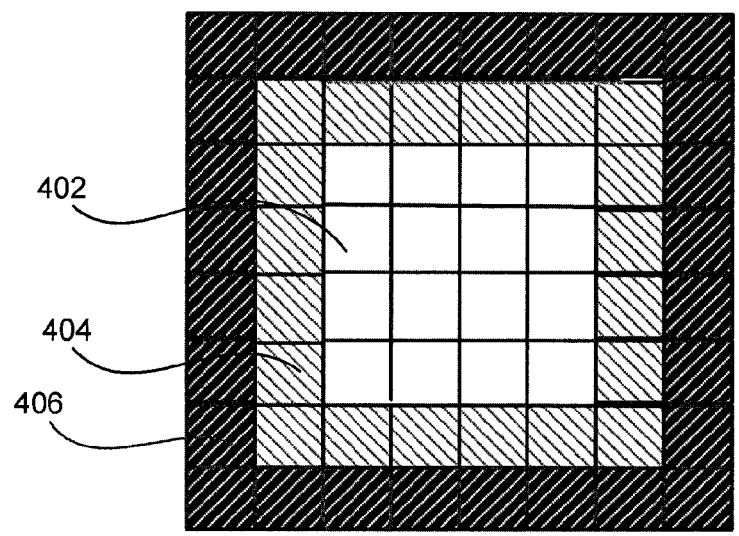
FIG. 4 illustrates a process of processing border texels using a double border, under some embodiments.

Current GPUs generally have hardware support for texture compression. Such compression relies on coherency within 4×4 texel blocks. For this reason, for most applications it is best not to have a 4×4 block span face textures. As shown in FIG. 3, some embodiments include adding a single-texel border to support hardware bilinear filtering. In order to optimize compression, an additional texel border is added to provide a multiple of 4×4. This generally results in two-texel borders for compressed textures. FIG. 4 illustrates a process of processing border texels using a double border, under some embodiments. As shown in diagram 400, the texture atlas 402 includes a first texel border 404 and a second texel border 406.

Figure 5:
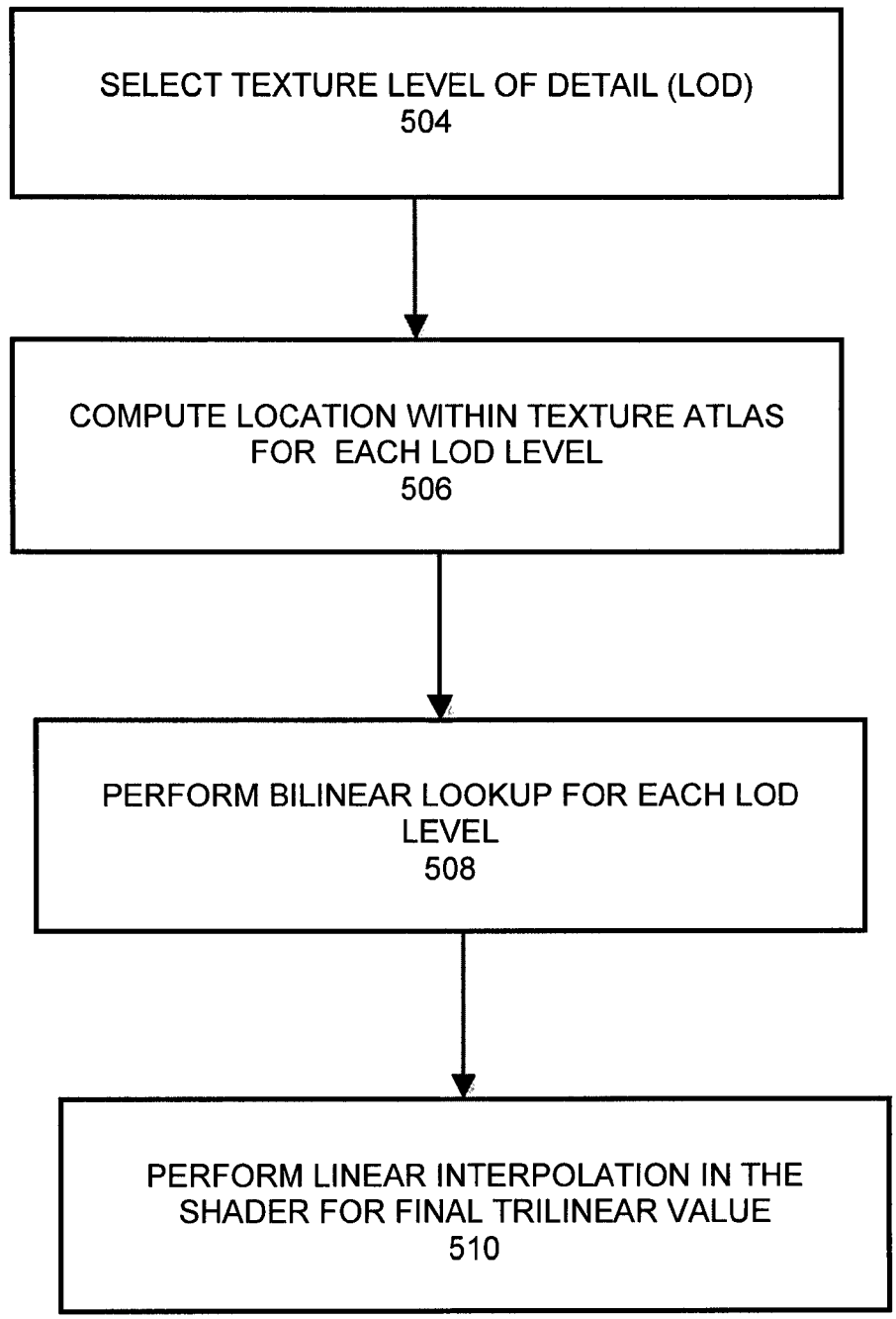
FIG. 5 is a flowchart that illustrates a method of performing real-time texture mapping, under some embodiments.

In an original Ptex system, there is one texture per face, and when crossing borders with a filter kernel, the system must perform some amount of indirection. This process significantly reduces real-time or runtime applicability of Ptex. In some embodiments, the packed texture process 120 implements one or more mechanisms that enable true real-time operation of the Ptex texture mapping method. One such mechanism is an additional mapping into the texture-atlas space. FIG. 5 is a flowchart that illustrates a method of performing real-time texture mapping, under some embodiments. The method 500 of FIG. 5 assumes that the process performs trilinear-filtered lookups, and starts by a selection of the texture level of detail (LOD), act 502. Trilinear filtering is an extension of bilinear texture filtering, which also performs linear interpolation between mipmaps. In act 504, the process computes the location within the texture atlas for each LOD level, and performs a hardware, bilinear lookup for each LOD level, act 506. After the lookup is done, the process performs a linear interpolation (lerp) in the shader to obtain a final trilinear value, act 510. As stated above, the process 500 is for the case of trilinear filtered lookups. For non-filtered lookups, the process is simpler in that it only requires finding the location in the texture atlas and performing a single lookup.

As shown in FIG. 5, an initial act in the process of performing a trilinear-filtered, packed Ptex lookup is to determine which resolution of face texture is desired (act 502). In conventional hardware trilinear filtering, this is done automatically by the GPU. However, hardware trilinear-filtering assumes the derivative of texture space with respect to screen space is continuous everywhere. In general, this is not the case for a texture atlas, although it may be sufficient for conventional texture atlasing in some cases. However, tiled textures generated using real-time processes often require manual texture LOD selection. An example section of programming code for selecting the LOD level of a texture under some embodiments is provided below.

```
Float ComputeLOD( float2 vUV, float n MipLevels )
{
    Float 2 vDx = ddx(vUV);
    Float 2 vDx = ddx(vUV);
    // Compute du and dv magnitude across quad
    float2 vDCoords;
    vDCoords = vDx * vDx;
    vDCoords += vDy * vDy;
    // Standard mip mapping uses max here
    float fMaxTexCoordDelta = max(vDCoords.x, vDCoords.y);
    float fMipLevelPower;
    if (fMaxTexCoordDelta ==0)
        fMipLevelPower = nMipLevels – 1;
    else
    {
        // 0.5 is for the square root
        fMipLevelPower = 0.5 * log2(1.0 / fMaxTexCoordDelta);
    }
    float mipLevel = clamp (fMipLevelPower, 0, nMipLevels – 1);
    return nMipLevels – 1 – mipLevel;
}
```

The above code listing provides an example implementation of performing texture LOD selection under some embodiments. Allowing for non-square textures simply requires a scale by aspect ratio on one of the directions.

Figure 6:
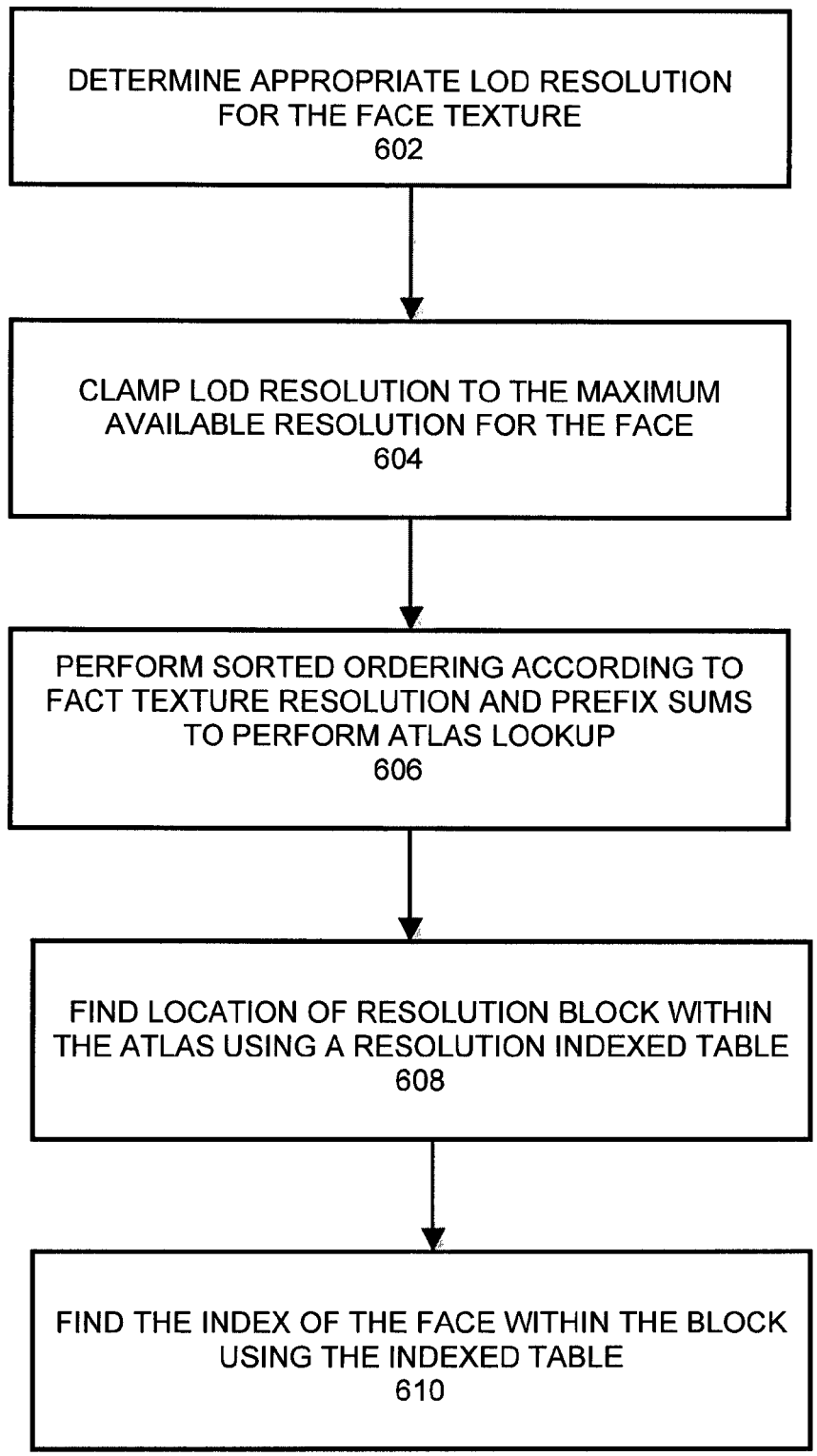
FIG. 6 is a flowchart that illustrates a method of performing texture lookups in a packed texture atlas, under an embodiment.

Once the appropriate LOD resolution has been determined, a texture lookup can be done in the packed texture atlas. FIG. 6 is a flowchart that illustrates a method of performing texture lookups in a packed texture atlas, under an embodiment. As shown in method 600, the appropriate LOD resolution for the face texture is first determined, act 602. The appropriate LOD resolution is then clamped to the maximum resolution available for that face (e.g., mip level 0), act 604. The method then uses a sorted ordering according to face texture resolution and prefix sums to look up the maximum resolution for a face texture without having to resort to any per-face information, act 606. The process then finds the location of the resolution block within the packed texture atlas, act 608. In some embodiments, this is accomplished by performing a lookup in a table indexed by resolution. Table 1 below illustrates possible face counts and prefix sums corresponding to different maximum resolutions, under an embodiment. The sorted ordering and prefix sum are then used again to find the index of the face within the block, act 610. In general, not all faces will have a representation in the resolution block, as some face-texture base resolutions will be higher than others, as is also illustrated in Table 1.

TABLE 1

| MAX RESOLUTION | FACE COUNT | PREFIX SUM |
|---|---|---|
| 16 × 16 | 5 | 5 |
| 32 × 32 | 5 | 10 |
| 64 × 64 | 3 | 13 |

With reference to Table 1, when faces are sorted by resolution, the prefix sum of face counts for each resolution is provided. The process then looks up the resolution for any given face from the index in the sorting. For the example of Table 1, a face index 7 would have a maximum resolution of 32×32 because it is greater than 5 and less than 10. An index of that face within that bin would be 2, since 7−5=2.

In an embodiment, the process finds the face texture origin within the resolution block using the index of the face within the resolution block. For example, if the texture width is W and the face texture width including borders is w, then the number of faces in a row is n=⌊W/w⌋. Using i as the index within the block, the process computes the row as ⌊i/n⌋ and the column as i % n.

In general, each face has its own implicit UV parameterization. To facilitate implementation, a specific convention is adopted with respect to the order of the vertices in the quad. For example, the first index is chosen to be (0,0), the next is (1,0) and the last as (0,1). Other assignments are also possible and are explicitly defined within the process. The adopted index assignments can be assigned in the hull-shader stage. The pixel shader will receive the interpolated coordinate, which is referred to as the 'face UV'. The primitive ID, which may also be needed can also defined in the hull-shader stage.

Scale and offsets are applied to get the face UV range of [0,1] mapped into the atlas UV coordinates, including an offset to get to the right resolution block and another to put the face texture origin (0,0) inside the face border. The code listing below provides an example implementation of a process of computing a UV within a packed texture atlas, under some embodiments. This code segment essentially illustrates how to go from face UV coordinates to atlas UV coordinates.

```
float2 ComputeUV(
    uint faceID, // From SV_PrimitiveID
    float2 faceUV, // Position within the face
    uint nLog2, // Log2 of the resolution we want
    int textwidth, // Atlas texture width
    int resOffset, // Prefix sum of this resolution
    int rowOffset, // Start of resolution block in atlas
    int borderSize ) // Texel thickness of border on each face
{
    // Here we assume a square aspect ratio.
    // A non-square aspect would simply scale the height
    // relative to the width accordingly.
    float faceWidth = << nLog2;
    float faceHeight = faceWidth;
    float borderedFaceWidth = faceWidth + 2*borderSize;
    float borderedFaceHeight = borderedFaceWidth;
    int nFacesEachRow = (int)texWidth / (int) borderFaceWidth;
    int iFaceWithinBlock = faceID - resOffset;
    float2 faceOrigin = float2(
        (iFaceWithinBlock % nFacesEachRow) * borderedFaceWidth,
        (iFaceWithinBlock / nFacesEachRow) * borderedFaceHeight
        + rowOffset );
    // Take face UV into account.
    // Still in texel units, but generally not
    // an integer value for bilinear filtering purposes.
    float2 uv = float2(faceWidth, faceHeight) * faceUV;
    uv += float2(nBorderSize, nBorderSize);
    uv += faceOrigin;
    // Finally scale by texture width and height to get
    // value in [0,1].
    return float2(uv) / float2(texWidth, textHeight);
}
```

Once the face UV coordinates are converted to atlas UV coordinates, the process performs a bilinear filtered lookup for each LOD that is needed, and then a final trilinear linear interpolation between these LOD values.

Figure 7:
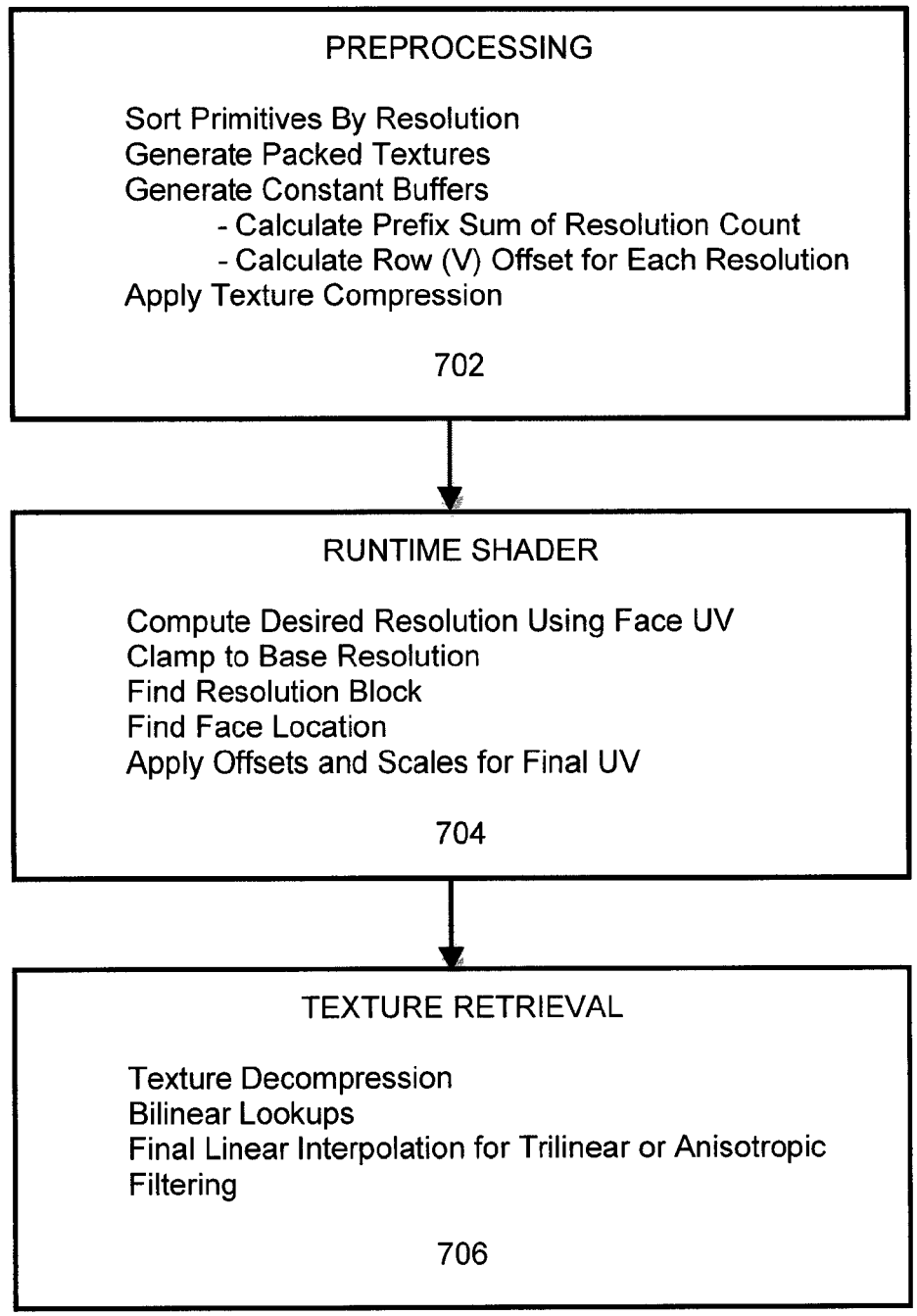
FIG. 7 illustrates a method of texture atlas processing, under some embodiments.

FIG. 7 illustrates a method of texture processing, under some embodiments. As shown in diagram 700 of FIG. 7, certain functions 702 are performed as preprocessing acts performed by pre-processing unit 115 in CPU 114. These include sorting primitives by resolution, generating packed textures, and generating constant buffers by calculating the prefix sum of the resolution count and calculating the row (V) offset for each resolution. A runtime shader, such as shader 126 in GPU 102 then performs certain acts 704 such as computing the desired using the face UV coordinates, clamping to the base resolution, finding the resolution block and face location, and applying offsets and scales for the final UV coordinates. The texture process 120 computes the UV coordinates by finding the resolution of the texture, computing the row and column of the texture, scaling by the bordered face size, and adding the border offset, scaled face parameterization and row offset. It then performs a lookup to find the location in the block.

The retrieval of texture values is performed in block 706, which performs the tasks of texture decompression, which can be done in hardware along with the bilinear filter, when used. The bilinear lookups could be point sampled, as done for displacement. The lookup operation uses the prefix sum in a constant buffer as defined by a base (max) resolution and an offset in the bin, and the row (v) offset in the constant buffer. The location of the block may be defined as shown in the following example code listing:

```
FacesPerRow = floor(face width / texture width)
Row = floor((PrimitiveID - offset / FacesPerRow)
Column = (PrimitiveID - offset) % FacesPerRow
```

Figure 8:
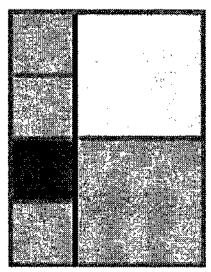
FIG. 8 illustrates certain cases of resolution discrepancy and bilinear lookups, under some embodiments.
Figure 8:
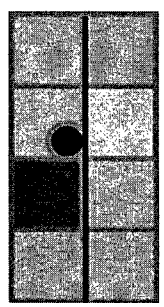
Figure 8:
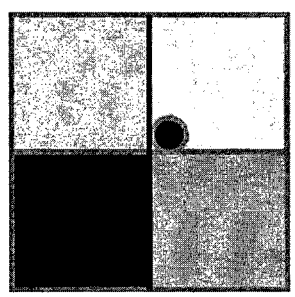
Figure 8:
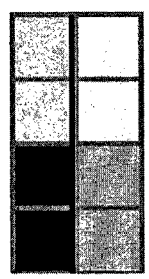
Figure 8:
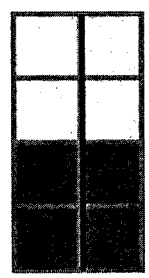

In certain cases there can be discrepancies in resolution that translate to discontinuities when approaching a polygon edge from either side. FIG. 7 illustrates certain cases of resolution discrepancy and bilinear lookups, under some embodiments. Case 702 illustrates an example of resolution discrepancy that can happen when the gradient used for mip selection changes as the edge of a polygon is crossed. In this case a 1×4 polygon edge adjacent to a 1×2 polygon edge. Though this issue is not exclusive to the packed texture atlas solution, it is generally mitigated by the final linear interpolation step of the trilinear filtering performed by the texture process 120, and as shown in block 706 of FIG. 7. As shown in FIG. 8, case 804 illustrates a bilinear lookup into the border from the view of the left face (1×4) of case 802, and case 806 illustrates a bilinear lookup into the border from the view of the right face (1×2) of case 802. In some embodiments, the process changes the border of the higher resolution face to that of the lower resolution face by downsampling. Case 808 illustrates resolving resolution discrepancies by such a downsampling operation.

A second cause for resolution discrepancy is capping to different resolutions due to different maximum (mip level 0) resolutions. The problem of max resolution discrepancy is mitigated by effectively clamping borders to the lower resolution when padding by adding additional border texels, as shown in FIG. 4. Case 810 of FIG. 8 illustrates a solution for displacement when values must match exactly by replicating at the lower resolution.

In an embodiment, the packed texture atlas process 120 includes a function of adding displacement through displacement mapping to add geometric detail to a coarser mesh. In general, displacement mapping uses a texture map to cause an effect where the actual geometric position of points over a textured surface are displaced according to the value the texture function evaluates to at each point on the surface to give a sense of depth and detail to the surface. Displacement mapping thus provides a method of geometric LOD, and displacement maps are generally a more compact representation of the same geometry expressed as explicit polygons. The use of displacement maps in conjunction with embodiments is that seams can be handled naturally instead of by manual or runtime stitching.

In some embodiments, each polygon of the coarse mesh is tessellated further at runtime, and the vertices are displaced according to values stored in a displacement texture map. The model can be rendered without the displacement for the lowest poly model, and different tessellations can be applied for higher quality models. In present displacement mapping techniques, there is just a single scalar per texel. Some embodiments improve this characteristic by providing vector displacement in which a 3D vector is used to specify displacement. Such a technique generally requires more memory on a per texel basis, but is much more expressive with regard to rendering.

Authoring displacement maps in a conventional texture atlas without cracks can be quite difficult. If a shirt, for example, is unwrapped onto a texture, the edges where the charts meet on the model must match in value at every location, which is why certain applications, such as games typically only apply displacement maps to flat objects like terrain. For displacement maps the process treats the borders and corners through a specific filter that uses point sampling, as opposed to an extra border for filtering. In this case, adjacent faces must have identical values along their shared border to avoid cracks when using hardware tessellation. Instead of copying in a border from an adjacent face, the texture mapping process under some embodiments changes the original borders by averaging them as shown in FIG. 8.

Corners of a face texture correspond to a vertex in the model. To handle such corners, the process walks the mesh around the vertex, gathers all corner values and averages them to derive a final corner texture value. This value is then written back to all corners that share this vertex so that they are consistent and do not produce cracks. In general, it is necessary for displacement. If this average is recomputed for each quad and floating-point math is used, it will be necessary to accumulate in the same order for each quad.

In some embodiments, displacement mapping is performed in object space in the domain shader. The process can point sample from the highest resolution displacement map regardless of tessellation level. When there is no filtering, the filter-related issues of the packed texture atlas are not relevant, and there is both less compute and bandwidth cost than for the typical texture map application in a pixel shader.

Conventional texture atlases are often difficult to author without wasting texture space between the charts. For example, in a typical example of producing a texture atlas may result in a case where 37% of the atlas space is wasted. In contrast, the packed texture atlas method based on Ptex is built completely from rectangular pieces and is therefore much easier to pack into a rectangular domain. An average waste in this case may be on the order of 7%. In some embodiments, certain optimization techniques may be used to determined the optimal resolution to pack the face textures into, to reduce the amount of space wasted in the atlas.

Compared to conventional methods, the packed texture atlas method typically imposes a greater memory overhead, primarily due to the use of borders. Fundamentally, the border cost goes up proportional to the square root of the area. For example, each face of square resolution r and border size $n_B$ wastes $(2n_B+r)^2-r^2$ texels. Table 2 below illustrates some example costs as a percentage of waste due to borders in packed Ptex.

TABLE 2

| RESOLUTION | BORDER SIZE | | |
|---|---|---|---|
| | 1 | 2 | 3 |
| 4 × 4 | 56/56% | 75/75% | 89/89% |
| 8 × 8 | 36/41% | 56/62% | 75/80% |
| 16 × 16 | 21/24% | 36/41% | 56/62% |
| 32 × 32 | 11/13% | 21/23% | 36/40% |
| 64 × 64 | 6.0/6/4% | 11/12% | 21/23% |
| 128 × 128 | 3.1/3.2% | 6.0/6.2% | 11/12% |

Table 2 illustrates the memory overhead for adding texel borders under some embodiments. The first percentage value in each pair is for a single resolution and the second percentage value in each pair is for mip chains down to 4×4. Table 2 illustrates two characteristics of the packed texture process. First is an indication of how high the per-face resolution should be to keep memory overhead down; and second is an indication adding more than two texel borders (as would be required for anisotropic filtering) is generally too expensive in memory cost for most applications, and thus in general, two texel borders, as shown in FIG. 2 is optimum in most cases.

Some embodiments of the packed texture atlas are directed to having a separate texture per face. Alternatively, embodiments could put each per-face texture in its own texture array slice. This may simplify the texture addressing to some extent. However, there are practical limitations in the number of texture array slices, and resolutions cannot be mixed within a single texture array. Therefore, what would be a single texture packed texture atlas method would be split into multiple textures, one for each resolution, with further splitting as required for texture array limits. In this case, the amount of texture data used in the shader does not increase, except perhaps due to alignment or other per-texture costs along with the cost of additional borders, but the amount of conditional reads may be higher.

Some embodiments are also directed to computing per-face texture information. Alternatively, the packed texture atlas process could be configured to store the per-face texture information in a resource indexed by face ID, and possibly by mip level.

In the Ptex-based method of the packed texture atlas, an individual rectangular region texture map is assigned to each primitive. In an alternative embodiment, the process can be configured to group multiple primitives adjacent in model space into rectangular patches in texture space for packing and handling seams. This reduces the overhead for borders and makes larger filter kernels feasible.

For purposes of the present description, the terms "component," "unit," "module," "circuit," and "process," may be used interchangeably to refer to a processing unit that performs a particular function and that may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media. Under some embodiments, the computer readable media may store program code or software instructions that are executed by a computer system and cause the computer system to perform at least some of the functions and processes of a method as shown in FIG. 5.

The packed texture atlas process under some embodiments described herein provides an implicit texture map parameterization for GPU rendering. It is an implicit parameterization of a quad-based model for texture mapping, including displacement mapping. It builds on the Ptex method by packing per quad (face) textures into a single texture atlas and padding the per-quad textures for bilinear filtering and texture compression. Displacement mapping without cracks is achieved by modification of the borders. A prefix sum is used to enable runtime texture lookups.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. The detailed description is thus intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for processing textures for real-time rendering, in a processor, an object defined by a plurality of polygons, the method comprising:
    associating an independent texture map with each face of a mesh to produce a plurality of face textures;
    providing borders for the filtering operations by copying texels from a border of a neighboring face of the each face to prevent seam artifacts;
    assigning a defined order of vertices in a quad of each face to produce a respective implicit UV parameterization for each face to convert, in a hardware shader component, face UV coordinates to atlas UV coordinates for one or more filtering operations for level of detail (LOD) values;
    applying scale and offset values to map a converted face UV range to the atlas UV coordinates, wherein the offset value gets to a proper resolution block;
    packing the plurality of face textures and their respective mip levels one after another in rows into a single texture atlas, wherein the atlas is divided into a plurality of blocks based on a resolution of the face textures;
    sorting the face textures and mip levels by resolution to form a plurality of resolution blocks including the proper resolution block;
    arranging the face textures comprising mips of corresponding resolution into a sequence of resolution blocks;
    performing a bilinear lookup for each required LOD value of the LOD values and a trilinear interpolation between the each required LOD value to obtain a final trilinear value to compute a location of a texture within a resolution block using the face texture resolution, a texture width, and an index within the proper resolution block.

2. The method of claim 1 wherein the providing borders step further comprises:
    adding a border to the texture map for each face, the border comprising additional texels including at least border texels from an adjacent face texture map; and
    performing a filtering operation of the one or more filtering operations on the face textures to resolve resolution discrepancies caused when crossing an edge of a polygon.

3. The method of claim 2 wherein each face texture includes a mip chain comprising mipmaps arranged in order of resolution, and wherein the resolutions of subsequently arranged mipmaps differ by a power of two.

4. The method of claim 1 wherein the index is computed from a prefix sum of a resolution count and a sorted ordering determined by the sorting.

5. The method of claim 4 wherein the border on each side of the texture map is of a texel size corresponding to at least one-half the width of a filter kernel used by the GPU, and further comprising adding a padding to the border comprising additional texels in order to increase the dimension of the texture map to correspond to a multiple of a 4×4 matrix to facilitate texture compression.

6. The method of claim 5 further comprising:
    averaging texel values in the border to enable displacement mapping of the mesh; and
    providing a 3D vector to specify the displacement in the displacement mapping.

7. The method of claim 1 further comprising:
tessellating each polygon of the mesh at runtime in the GPU; and
displacing vertices of each polygon according to values stored in a displacement texture map.

8. The method of claim 1 further comprising:
indexing the single texture atlas by resolution; and
defining a table that correlates the each resolution with a corresponding face count and prefix sum.

9. The method of claim 1 further comprising performing texture lookups in the single texture atlas through the one or more filtering operations, comprising:
selecting a level of detail of a texture;
computing a location within the single texture atlas for each level of detail;
performing the bilinear lookup for each level of detail; and
performing a linear interpolation operation as a shader process to generate the final trilinear value of the texture.

10. A method for looking up a face texture for rendering of an object comprising a mesh of polygons in a processor, comprising:
selecting a level of detail of the face texture;
providing borders for the filtering operations by copying texels from a border of a neighboring face of the each face to prevent seam artifacts;
computing a location with a single texture atlas for each level of detail, wherein the single texture atlas comprises a plurality of packed face textures each having an independent texture map associated with each face of the mesh, the texture atlas divided into a plurality of blocks based on a resolution of the face textures by packing the plurality of face textures and their respective mip levels one after another in rows into a single texture atlas, wherein the atlas is divided into a plurality of blocks based on a resolution of the face textures, assigning a defined order of vertices in a quad of each face to produce a respective implicit UV parameterization for each face to convert, in a hardware shader component, face UV coordinates to atlas UV coordinates for one or more filtering operations for level of detail (LOD) values, sorting the face textures and mip levels by resolution to form a plurality of resolution blocks, and arranging the face textures comprising mips of corresponding resolution into a sequence of resolution blocks;
applying scale and offset values to map a converted face UV range to the atlas UV coordinates, wherein the offset value gets to a proper resolution block within the sequence of resolution blocks;
performing a bilinear lookup for each level of detail;
performing a linear interpolation operation to generate a final trilinear value of the texture; and
computing a location of a texture within a resolution block using the face texture resolution, a texture width, and an index within the proper resolution block.

11. The method of claim 10 further comprising clamping the selected resolution to the maximum resolution available for the respective face.

12. The method of claim 11 further comprising:
indexing the single texture atlas by resolution by an index that is computed from a prefix sum of the resolution count and a sorted ordering determined by the sorting; and
defining a table that correlates the each resolution with a corresponding face count and prefix sum.

13. The method of claim 12 wherein the providing borders step further comprises adding a border to the texture map for each face, the border comprising additional texels including at least border texels from an adjacent face texture map, and performing the bilinear lookup using the borders, and using the face count and prefix sum to find the location in the atlas.

14. The method of claim 12 wherein the providing borders step further comprises:
adding a border to the texture map for each face comprising additional texels including at least border texels from an adjacent face texture map; and
averaging texel values in the border to enable displacement mapping of the mesh, wherein the border on each side of the texture map is of a texel size corresponding to at least one-half the width of a filter kernel used by the GPU.

15. The method of claim 12 further comprising:
tessellating each polygon of the mesh at runtime in the GPU; and
displacing vertices of each polygon according to values stored in a displacement texture map.

16. A system for processing textures for rendering of a mesh made up of a plurality of polygons specifying an object to be rendered in a processor, comprising:
a texture mapping component associating an independent texture map with each face of the mesh to produce a plurality of face textures;
a border processing component providing borders for the filtering operations by copying texels from a border of a neighboring face of the each face to prevent seam artifacts;
an atlas generating component packing the plurality of face textures and their respective mip levels one after another in rows into a single texture atlas, wherein the atlas is divided into a plurality of blocks based on a resolution of the face textures, assigning a defined order of vertices in a quad of each face to produce a respective implicit UV parameterization for each face to convert, in a hardware shader component, face UV coordinates to atlas UV coordinates for one or more filtering components acting on level of detail (LOD) values, sorting the face textures and mip levels by resolution to form a plurality of resolution blocks, arranging the face textures comprising mips of corresponding resolution into a sequence of resolution blocks, and computing a location of a texture within a resolution block using the face texture resolution, a texture width, and an index within the resolution block, wherein the index is computed from a prefix sum of the resolution count and a sorted ordering determined by the sorting;
an offset component applying scale and offset values to map a converted face UV range to the atlas UV coordinates, wherein the offset value gets to a proper resolution block within the sequence of resolution blocks;
a texture processing component adding a border to the texture map for each face comprising additional texels including at least border texels from an adjacent face texture map; and
a filtering component performing a bilinear lookup for each level of detail, performing a linear interpolation operation to generate a final trilinear value of the texture, and computing a location of a texture within a resolution block using the face texture resolution, a texture width, and an index within the proper resolution block.

17. The system of claim 16 wherein the texture processing component further performs a filtering operation of a texture process on the face textures to resolve resolution discrepancies caused when crossing an edge of a polygon.

18. The system of claim 17 wherein each face texture includes a mip chain comprising mipmaps arranged in order of resolution, and wherein the resolutions of subsequently arranged mipmaps differ by a power of two.

19. The system of claim 17 wherein the border on each side of the texture map is of a texel size corresponding to at least one-half the width of a filter kernel used by the GPU.

20. The system of claim 19 wherein the texture processing component further adds a padding to the border comprising additional texels in order to increase the dimension of the texture map to correspond to a multiple of a 4×4 matrix to facilitate texture compression.

21. The system of claim 17 further comprising a displacement mapping component tessellating each polygon of the mesh at runtime in the GPU, and displacing vertices of each polygon according to values stored in a displacement texture map, and a component averaging texel values in the border to enable displacement mapping of the mesh.

22. The system of claim 17 wherein the one or more filtering components comprises a texture lookup component selecting a level of detail of a texture, computing a location within the single texture atlas for each level of detail, performing a bilinear lookup for each level of detail, and performing a linear interpolation operation as a shader process to generate the final trilinear value of the texture.

* * * * *